(12) United States Patent
Edwards

(10) Patent No.: US 6,359,763 B1
(45) Date of Patent: Mar. 19, 2002

(54) MONITORING APPARATUS FOR ELECTRICAL CIRCUITS

(75) Inventor: Bryon I Edwards, Staffordshire (GB)

(73) Assignee: Alstom UK Limited (GB)

( * ) Notice: Subject to any disclaimer, the term of this patent is extended or adjusted under 35 U.S.C. 154(b) by 0 days.

(21) Appl. No.: 09/419,431

(22) Filed: Oct. 15, 1999

(30) Foreign Application Priority Data

Oct. 16, 1998 (GB) ............................................. 9822515

(51) Int. Cl.[7] .................................................. H02H 3/00
(52) U.S. Cl. ............................ 361/93.1; 361/18; 361/42
(58) Field of Search ................ 361/93.1, 115, 361/42, 18

(56) References Cited

U.S. PATENT DOCUMENTS

| 4,992,723 A | * | 2/1991 | Zystra et al. ................. 361/42 |
| 5,754,113 A | | 5/1998 | Boyer ......................... 340/638 |

FOREIGN PATENT DOCUMENTS

| EP | 0 121 990 A1 | 10/1984 | ............ H05B/1/02 |
| EP | 0 641 688 A1 | 3/1995 | ............ B60R/21/00 |
| GB | 2 034 136 A | 5/1980 | ............ H02H/3/04 |
| GB | 2 272 119 A | 5/1994 | ............ H02H/3/04 |
| JP | 10049792 | 2/1998 | ............ G01R/19/14 |

* cited by examiner

Primary Examiner—Stephen W. Jackson
(74) Attorney, Agent, or Firm—Kirschstein, et al.

(57) ABSTRACT

A trip circuit supervision circuit is disclosed for use in combination with a trip circuit comprising a circuit breaker trip coil connected in a supply line from a supply voltage and a trip relay contact connected in series with the circuit breaker trip coil. The supervision circuit is connected across the relay trip contact and includes a current sensing device. During normal operation, the supervision circuit draws a constant current from the supply line independent of supply voltage. Thus, changes in the current measured by the current sensing device enable the integrity of the supply voltage to be checked.

11 Claims, 7 Drawing Sheets

MONITORING APPARATUS FOR ELECTRICAL CIRCUITS

This invention relates to improvements in monitoring apparatus for electrical circuits, and in particular an improved apparatus for monitoring the integrity of a tripping circuit and the presence of a supply to the circuit. It is especially applicable to monitoring conditions which would prevent the energising of an un-energised electrical circuit, for example failure of a power supply for the circuit.

It is well known to provide a circuit breaker arranged to disconnect part of a high voltage (or relatively high) electrical circuit in response to the closing of a contact (the trip contact) attached to a low voltage electrical circuit. The trip contact and supply voltage form a part of a trip circuit. The circuit breaker may therefore comprise a trip coil and a circuit breaker contact. Closing the trip contact causes current to flow in the trip coil of the circuit breaker, which results in the opening of the circuit breaker and the disconnection of the high voltage circuit. When a fault occurs in the high voltage circuit, it is important that the circuit breaker can operate to disconnect the circuit, to minimise the damage caused.

It is normal practice to connect a monitoring circuit or supervision circuit across the open trip contact to provide an indication that the supply is available to energise the trip coil when the trip contact closes. In its simplest form, this circuit (hereinafter referred to as a trip circuit supervision circuit) can consist of a bulb or other visual or audible indicator connected across the trip coil as shown in FIG. 1. The bulb is lit while the trip contact is open and a supply voltage is present.

An improved monitoring circuit uses an electrical relay in place of the bulb. The contacts of this relay are held open while the trip contact remains open and the trip supply is present. Failure of the trip supply causes the relay contacts to close, initiating an audible or visual alarm.

Both these trip circuit supervision circuits present problems if the trip supply voltage varies widely.

The current flowing in the supervision circuit when the voltage is at its lowest value must be sufficient to light the bulb, or hold the relay contacts open. The current flowing in the supervision circuit when the voltage is at its highest must not be sufficient to trip the circuit breaker. The power dissipated by the supervision circuit can be excessive, at the highest voltage, particularly if the circuit is incorporated into the protective relay equipment which operates the trip contact.

It is required that failure of any component of a supervision circuit connected across a trip contact must not cause sufficient current to flow in through the circuit that will trip the circuit breaker.

An aim of at least one aspect of the present invention is to ameliorate the problems associated with the high power dissipation across the resistive element.

According to a first aspect, the invention provides a supervision circuit adapted for use in combination with a supervised circuit comprising at least one electrical component connected in series in a supply line from a supply voltage, the supervision circuit being connected across the electrical component and including a current sensing device, in which during normal operation of the supervised circuit the supervision circuit is adapted to draw a substantially constant current from the supply line independent of supply voltage fluctuations, and in which the current sensing device produces an output signal dependent upon the current drawn by the supervision circuit.

The electrical component may, for example, comprise a switch which is adapted to connect or disconnect a load in the circuit to the supply voltage.

In accordance with a second aspect, the invention provides a trip circuit supervision circuit for use in combination with a trip circuit comprising a circuit breaker trip coil connected in series in a supply line from a supply voltage and a trip relay contact connected in series with the circuit breaker trip coil in the supply line, the trip circuit supervision circuit being connected across the relay trip contact and including a current sensing device and which is, in which during normal operation the supervision circuit is adapted to draw a substantially constant current from the supply line independent of supply voltage fluctuations when the relay trip contact is open, and in which the current sensing device produces an output signal dependent upon the current drawn by the supervision circuit.

Preferably, the supervision circuit comprises a constant current source connected in series with the current sensing device.

Thus, in accordance with the invention, the prior art resistive load and bulb have been eliminated and replaced by a constant current circuit and a current sensing device. Of course, a bulb or other light emitting device could still be provided in addition as a simple check device, perhaps in series with the current sensing device.

An advantage of the invention is that the current circuit draws a current which does not vary with small changes in supply voltage as is the case of a resistive load. This results in a more stable current which is easy to monitor by the current sensing device. It also consumes less power. The power dissipated in the trip protection circuit is no longer dependent on the square of the supply voltage as with resistive load.

The output signal from the current sensing device may be used to drive a visual or audible warning device such as a bulb or siren. It could be logged by a computer or other device.

In a refinement, the constant current source may comprise first and second constant current sources connected in series with each other.

The use of the second constant current circuit acts as a safety back up in the event of failure of the first constant current source. If the first constant current circuit failed and produced a short circuit across the relay trip contact, sufficient current could flow to actuate the circuit breaker trip coil. The provision of the second constant current source prevents such a failure mode occurring by limiting the current.

The current sensing device may comprise a light emitting diode connected in series with the constant current source which illuminates a photodiode. The photodiode may be connected to a DC supply and allows current to flow when illuminated by the diode to produce the output signal. This also provides a high degree of isolation to prevent the formation of undesirable ground loops.

A switching means may be provided in series with the constant current source. By opening/closing the switching means it is possible to efficiently reduce the power consumed by the constant current source by switching the supervision circuit ON/OFF. Thus the switch may be modulated by a suitable pulse train. As an example, using a square wave would halve the power dissipation.

In accordance with a third aspect, the invention provides a trip circuit including a trip circuit supervision circuit, in which the trip circuit comprises at least one circuit breaker trip coil adapted to open a circuit breaker in a supply line in response to a current flowing in the coil in excess of a threshold value and a relay trip contact connected in series with the trip coil and in which the trip circuit supervision circuit includes a current sensing device connected in series across the relay trip contact, the supervision circuit being adapted to draw a constant current from the supply line independent of supply voltage when the trip contact is open, the current sensing device producing an output signal indicative of the current drawn by the supervision circuit.

The supervision circuit may comprise a constant current source and a current sensing device arranged In accordance with the first or second aspects of the invention.

The trip circuit may further include a circuit breaker auxiliary contact connected in series with the trip coil and the protection relay trip contact. A trip circuit supervision circuit in accordance with the first or second aspects of the invention (for example an electrical circuit including a current sensing device adapted to draw substantially constant current independent of fluctuation in the supply voltage) may be provided in parallel with the auxiliary contact. A further circuit breaker auxiliary contact may be provided across the first auxiliary contact. This further contact may be in series with the constant current circuit of the trip circuit protection circuit.

There will now be described, by way of example only, one embodiment of the present invention with reference to the accompanying drawings in which:

FIG. 2 shows schematically a trip protection circuit in accordance with the invention which incorporates a trip circuit supervision circuit.

Figure 1:
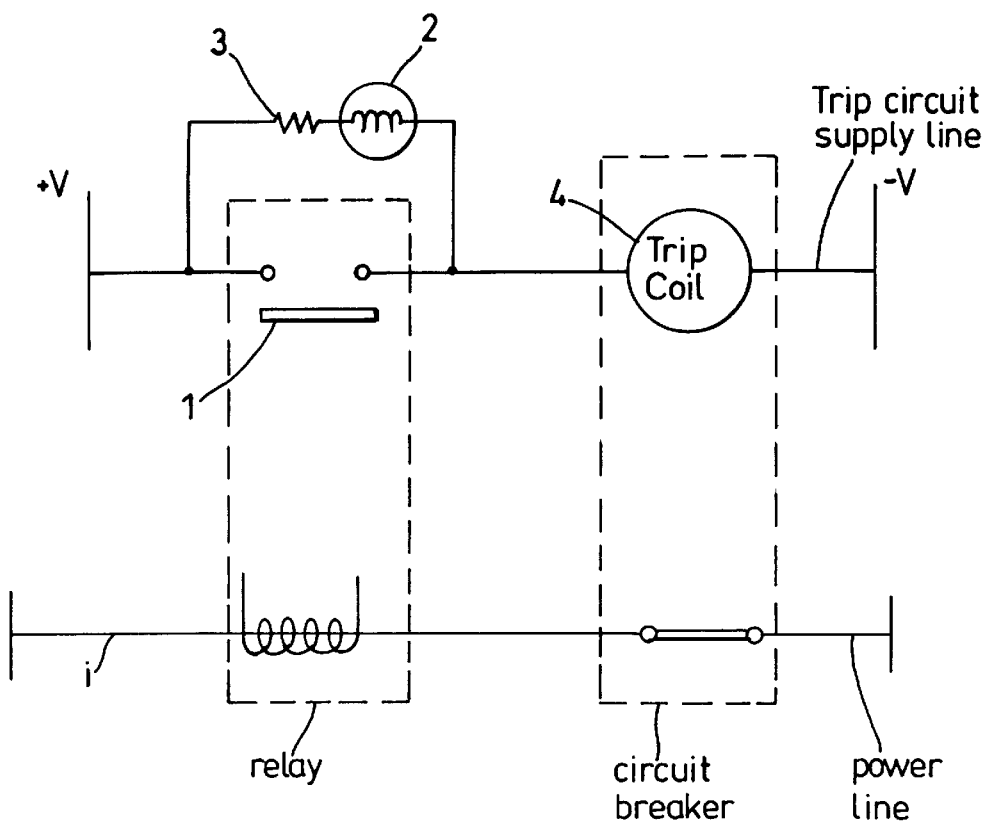
FIG. 1 is a schematic illustration of a basic trip circuit supervision circuit used in a prior art trip circuit supervision circuit.

The trip circuit comprises a normally-open protection relay trip contact 101 connected in series with a trip coil 102 of a circuit breaker in a line 103 between a positive and negative DC supply 104, 105. The trip coil opens the circuit breaker contacts (which are normally closed). In the event of fault on the line protected by the circuit breaker, the protection relay closes the trip contact 101 to connect the trip coil 102 to the positive supply. Current flowing in the line 103 through the trip coil 102 operates the circuit breaker to open its contacts.

In order for the circuit to function correctly, it is important that sufficient current flows through the trip coil when the relay trip contact closes. This depends upon the DC supply voltage and its connections to the trip coil.

It is essential that the trip circuit functions correctly, and so a trip circuit supervision circuit is provided. This comprises a single constant current circuit 106 and a current sensor 107 connected in series with each other across the relay trip contact.

Figure 4:
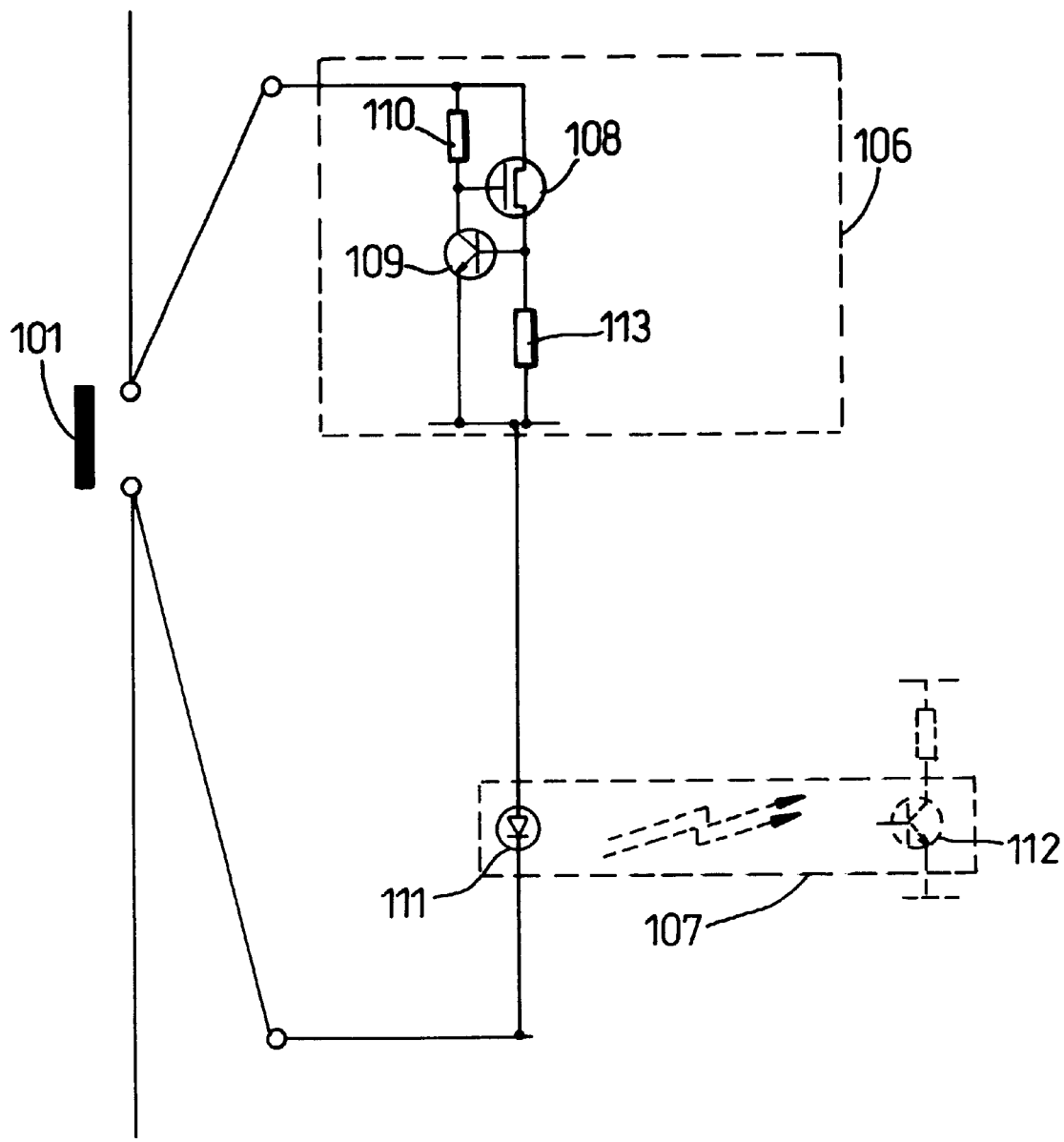
FIG. 4 is a circuit diagram of a basic trip circuit supervision circuit as shown in the embodiments of FIGS. 2 and 3.

An embodiment of a constant current circuit 106 and current sensor 107 connected in series across a protective element (such as the relay trip contact) is shown in detail FIG. 4.

The constant current circuit 106 comprises a high voltage MOSFET device 108, a transistor 109, a resistor 113 and a resistor 110. As the voltage across the opposite ends of the protective element increases (i.e. trip contact), the current through resistor 113 increases and the rise in voltage across it starts to turn transistor 109 on and 108 off to keep the current through the resistor constant. This enables a constant low level of current to be maintained through the trip circuit independent of supply voltage.

The current sensing device 107 comprises a light emitting diode 111 which is illuminated due to current flowing through the circuit 106. This light falls upon a photodiode or phototransistor 112 as shown. This provides good electrical isolations between the trip circuit and the output of the current sensing device.

Figure 5:
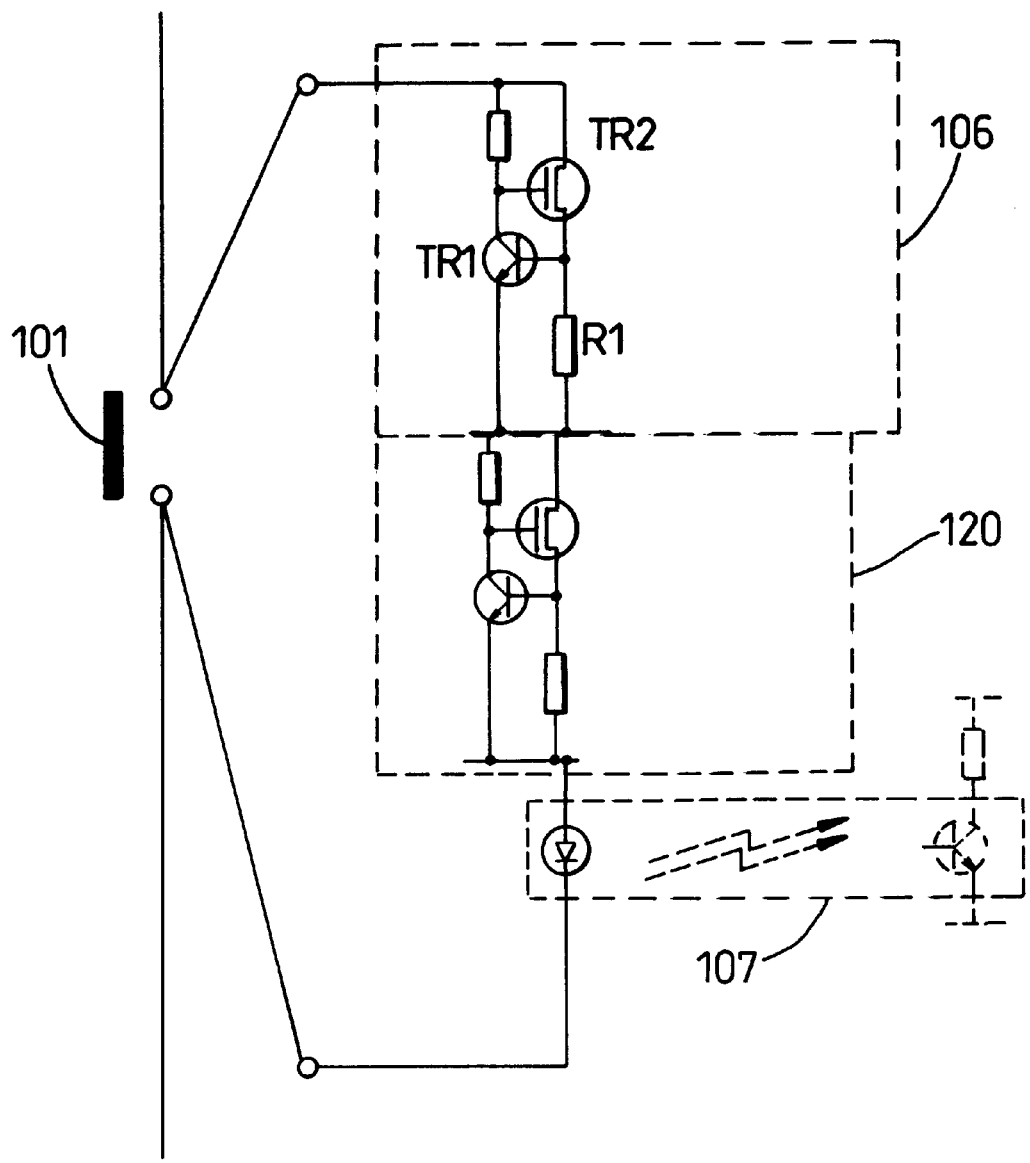
FIG. 5 is a circuit diagram of an alternative trip circuit supervision circuit.
Figure 6A:
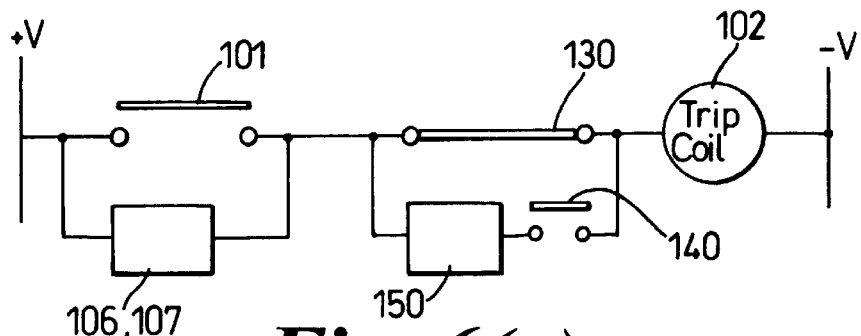
FIGS. 6(*a*) to (*d*) illustrate various modes of operation of the trip circuit.
Figure 6B:
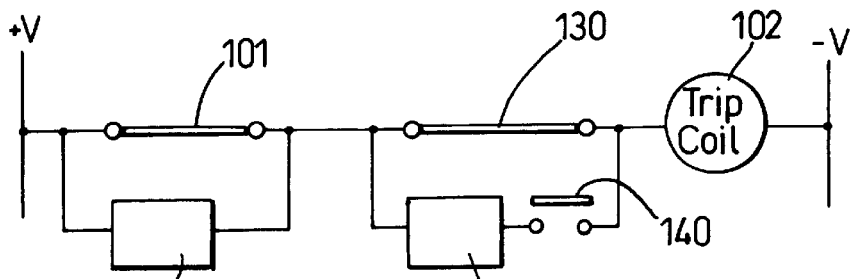
Figure 6C:
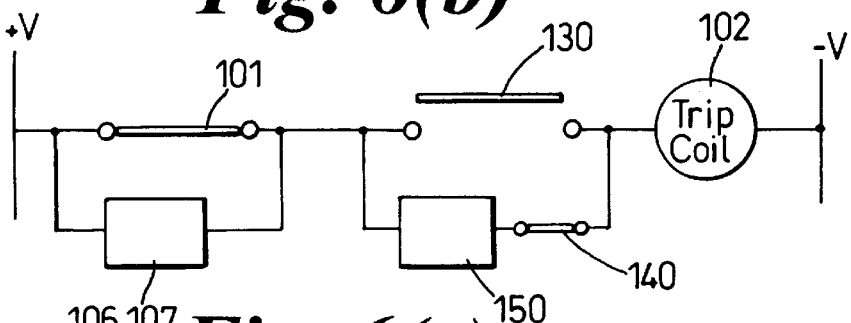
Figure 6D:
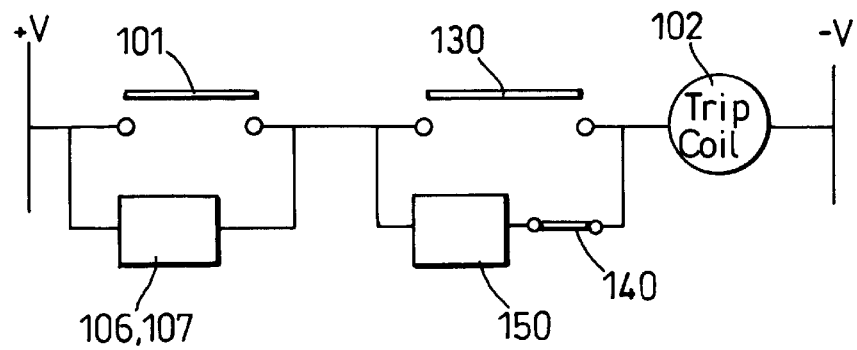

A refinement to the trip protection supervision circuit of FIG. 4 is shown in FIG. 5.

In this figure, an additional constant current circuit 120 is provided in series with the first constant current circuit.

Consider if only one constant current source was provided (as in FIG. 4) and one component fails as a short circuit (say transistor 108). This would allow excessive current to be drawn through the trip circuit. In an extreme case, this could be sufficient to operate the trip coil.

The provision of two constant current circuits 106, 120 in series ensures that, if one component fails as a short circuit, it is prevented from drawing excess current by the current limiting nature of the other circuit.

A refinement to the trip circuit is shown in FIG. 6. In this embodiment, an auxiliary circuit breaker contact 130 is provided in the DC line between the trip contact 101 and the trip coil 102. This auxiliary contact 130 is mechanically driven from the circuit breaker and is normally closed, but opens as the circuit breaker opens, to break the circuit.

To provide supervision when the auxiliary contact 130 is open, a supervision circuit is provided by a constant current source/current sensing device 150 (as shown in FIG. 4 or FIG. 5) provided across the ends of auxiliary contact 130 (as shown in FIG. 6).

A second auxiliary contact 140 is provided in series with the current sensing device across the contact 130. This second contact 140 works in opposition to contact 130 so that when contact 130 is open contact 140 is closed. This allows trip circuit supervision to be performed even when the breaker is in its open state.

By example, operation of the supervision circuit for various conditions of the trip circuit of FIG. 6 will now be explained. Four conditions are shown in FIGS. 6(*a*) to (*d*).

a) Circuit Breaker Closed

When the circuit breaker is closed (normal healthy power system conditions) then 130 is closed (140 open), the protection trip contact is open, and current is drawn through the Trip Coil and the trip protection circuit. This current is well below that required to trip the circuit breaker but sufficient to produce a measurable output current to the current sensing device. If the current drops to a low level (indicating an open circuit in the trip circuit) the output of the current sensing device changes state and can be used to initiate an alarm.

b) Trip Contact Closes

When the protection relay detects a fault condition on the power system the protection relay trip contact closes, 130 is closed. In this condition no current flows through the first trip circuit supervision circuit as its terminals are short-circuited. This is a genuine condition to trip the circuit breaker, it exists for a short time only, and by using delays in monitoring the output of the two current sensing devices, no alarm is initiated.

c) Circuit Breaker Opens (Trip Contact Still Closed)

When the circuit breaker operates (opens), 130 contact opens and 140 closes, current flows through the Trip Coil and the second trip circuits supervision circuit. This current is well below that required to trip the circuit breaker but sufficient to produce a measurable constant output current. If the current drops to a low level (indicating an open circuit in the trip circuit) then the output from the current sensor in the second trip circuit protection circuit can be used to initiate an alarm.

d) Circuit Breaker is Open and Trip Contact Opens

The protection relay contact opens and current flows through the Trip Coil and both current sensing devices. This current is well below that required to trip the circuit breaker. If the current drops to a low level (indicating an open circuit in the trip circuit) then the output from both current sensing devices can be used to initiate an alarm.

Figure 7:
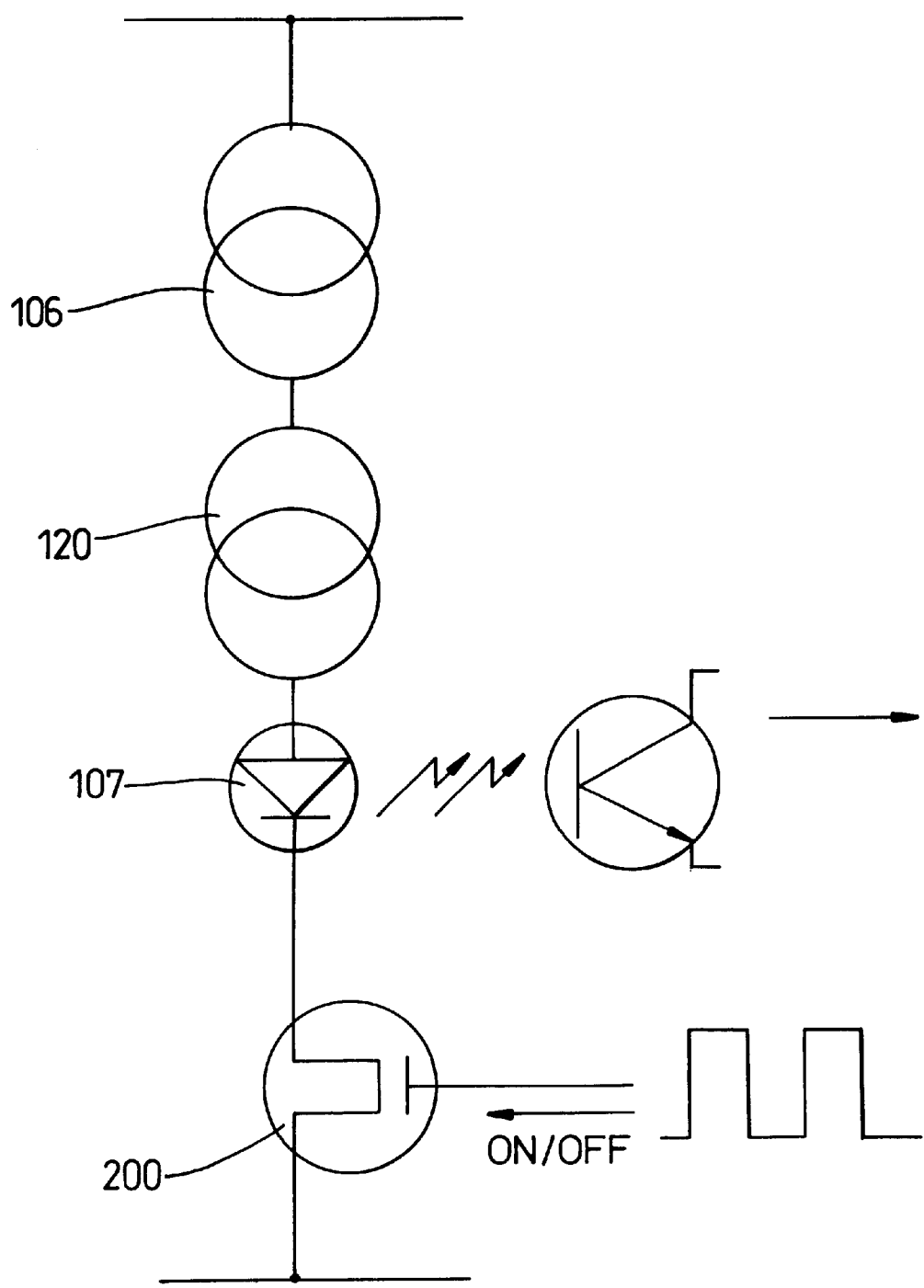
FIG. 7 is a circuit diagram of a second embodiment of a trip circuit in accordance with the invention.
Figure 9:
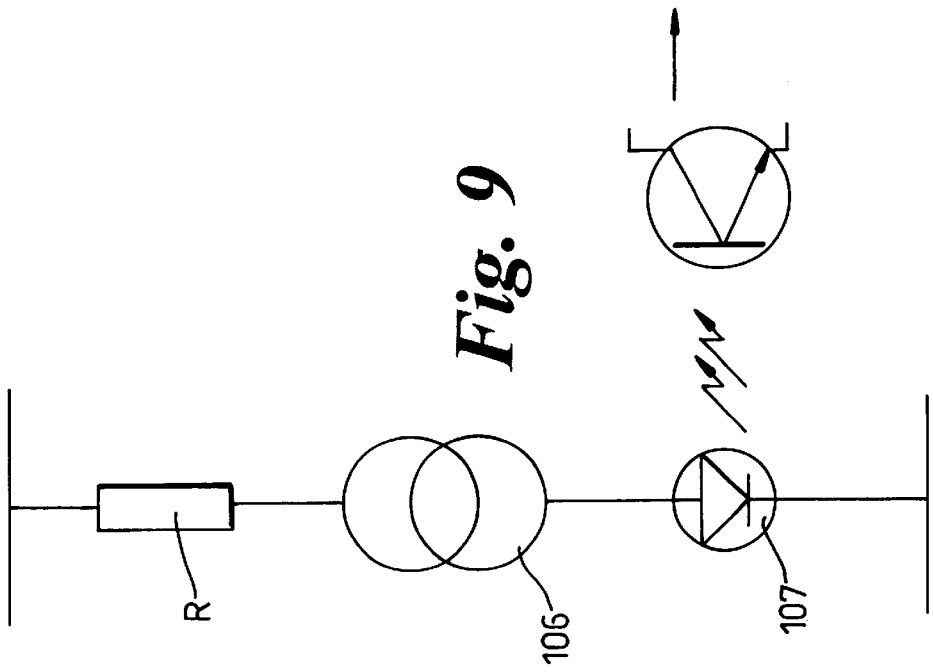
FIG. 9 is a circuit diagram of a fourth embodiment of a trip circuit.
Figure 8:
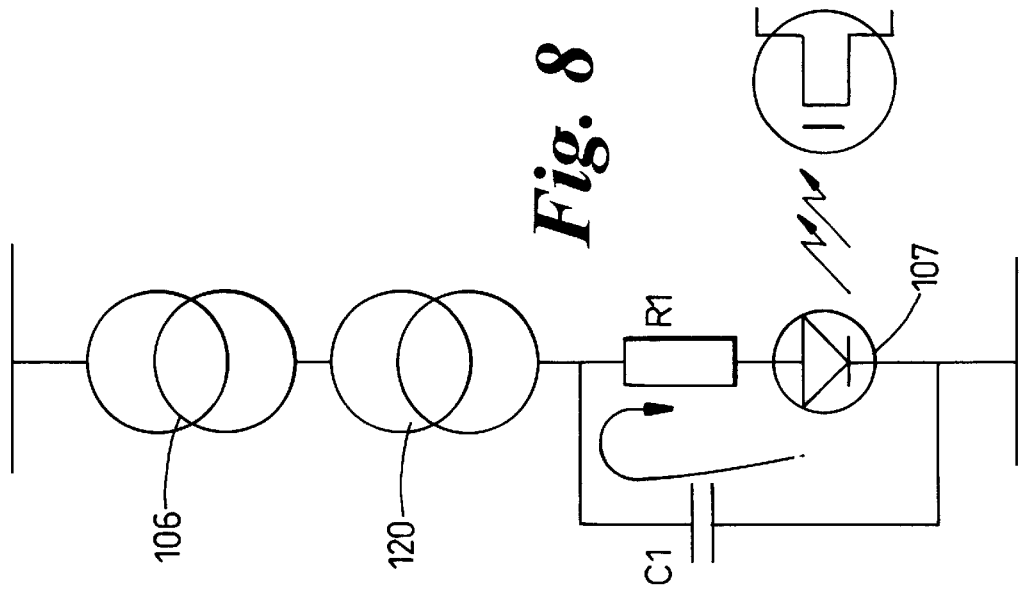
FIG. 8 is a circuit diagram of a third embodiment of a trip circuit.

Several alternate embodiments of the present invention are illustrated in the form of circuit diagrams in FIGS. 7, 8 and 9 of the accompanying drawings.

Figure 2:
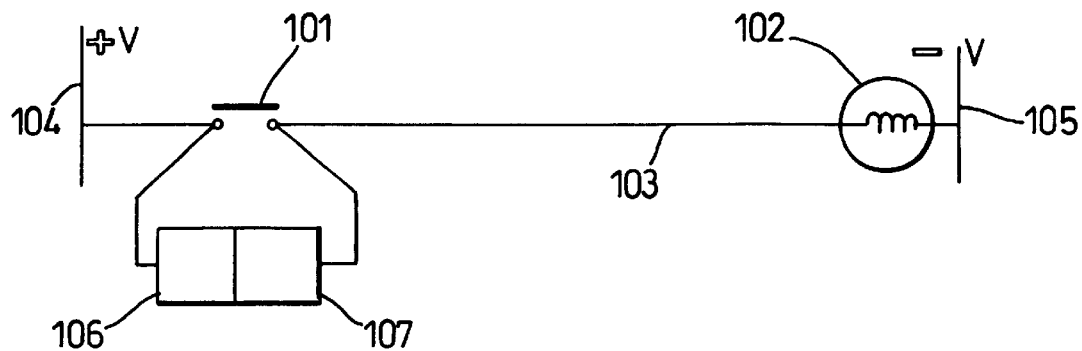
FIG. 2 is a schematic illustration of a first embodiment of a trip circuit incorporating a trip protection supervision circuit in accordance with the present invention.
Figure 3:
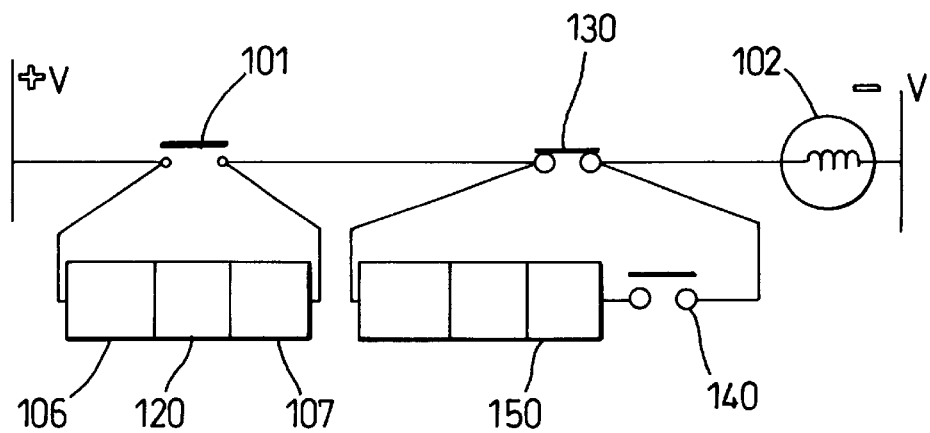
FIG. 3 shows a modification to the circuit of FIG. 2.

In FIG. 7 a switching device 200 is provided in series with the two constant current sources 106, 120 and the current sensor 107 of the embodiment of FIG. 3. By modulating the switch with a train of ON/OFF pulses 201, the current drain can be reduced. This could enable more circuits to be monitored within a given space as less heat would be dissipated. Of course, the switch could also be incorporated with a circuit such as shown in FIG. 2 in which only a single constant current source is provided. Although a square wave is shown, other pulse trains (perhaps with unequal duty cycles) could be employed.

In FIG. 8, a "drop-off delay circuit" is provided comprising an R-C circuit with one capacitor C1 in parallel with a resistor R1. This provides a controllable time delay (by suitable selection of the values of C1 and R1), so that the circuit can provide its own time delays. This enables it to function for short periods when no current flows.

Finally, a modification is shown in which the constant current source/current sensor of the present invention is combined with a parallel resistor of a prior art system to produce a hybrid system. In this embodiment, although the resistor is retained, the current source still acts to limit the current drawn so the power dissipation is a function of V and not $V^2$.

What is claimed is:

1. A trip circuit supervision circuit for use in combination with a trip circuit, comprising: a circuit breaker trip coil connected in series in a supply line from a supply voltage, and a relay trip contact connected in series with the circuit breaker trip coil in the supply line, said trip circuit supervision circuit being connected across the relay trip contact and including a constant current source connected in series with a current sensing device, said supervision circuit being operative, during normal operation, for drawing a substantially constant current from the supply line independent of supply voltage fluctuations when the relay trip contact is open, said current sensing device being operative for producing an output signal dependent upon the current drawn by the supervision circuit.

2. The trip circuit supervision circuit according to claim 1, wherein the constant current source comprises first and second sources connected in series with each other.

3. The trip circuit supervision circuit according to claim 1, wherein the current sensing device comprises a light emitting diode.

4. A trip circuit supervision circuit for use in combination with a trip circuit, comprising: a circuit breaker trip coil connected in series in a supply line from a supply voltage, and a relay trip contact connected in series with the circuit breaker trip coil in the supply line, said trip circuit supervision circuit being connected across the relay trip contact and including a current sensing device, said supervision circuit being operative, during normal operation, for drawing a substantially constant current from the supply line independent of supply voltage fluctuations when the relay trip contact is open, said current sensing device being operative for producing an output signal dependent upon the current drawn by the supervision circuit, the output signal being operative for driving a visual or audible warning device.

5. A trip circuit with a trip circuit supervision circuit, the trip circuit comprising: at least one circuit breaker trip coil connected in series in a supply line from a DC supply voltage and operative for opening a circuit breaker in an AC power line in response to a DC current flowing in the trip coil in excess of a threshold value, a relay trip contact connected in series with the trip coil, and a circuit breaker auxiliary contact connected in series with the trip coil and the relay trip contact, said trip circuit supervision circuit including a current sensing device connected across the relay trip contact, said supervision circuit being operative for drawing a substantially constant DC current from the supply line independent of supply voltage fluctuations when the trip contact is open, said current sensing device being operative for producing an output signal indicative of the current drawn by the supervision circuit.

6. The trip circuit according to claim 5, wherein a second trip circuit supervision circuit which includes a second current sensing device is provided in parallel with the circuit breaker auxiliary contact.

7. The trip circuit according to claim 5, wherein a further circuit breaker auxiliary contact is provided across the circuit breaker auxiliary contact.

8. A supervision circuit for use in combination with a supervised circuit, comprising:
   a) at least one electrical component connected in series in a supply line from a DC supply voltage, said supervision circuit being connected across said at least one electrical component and including,
      i) a means for drawing a substantially constant DC current from the supply line independent of supply voltage fluctuations during normal operation of the supervised circuit, and
      ii) a current sensing device for producing an output signal dependent upon the current drawn by the supervision circuit.

9. A trip circuit supervision circuit for use in combination with a trip circuit, comprising:
   a) a circuit breaker trip coil connected in series in a supply line from a DC supply voltage, and
   b) a relay trip contact connected in series with the circuit breaker trip coil in the supply line, said trip circuit supervision circuit being connected across the relay trip contact and including:
      i) a means for drawing a substantially constant DC current from the supply line independent of supply voltage fluctuations when the relay trip contact is open, and
      ii) a current sensing device for producing an output signal dependent upon the current drawn by the supervision circuit.

10. A trip circuit with a trip circuit supervision circuit, the trip circuit comprising:
 a) at least one circuit breaker trip coil connected in series in a supply line from a DC supply voltage and operative for opening a circuit breaker in an AC power line in response to a DC current flowing in the trip coil in excess of a threshold value, and
 b) a relay trip contact connected in series with the trip coil, said trip circuit supervision circuit being connected across the relay trip contact and including:
  i) a means for drawing a substantially constant DC current from the supply line independent of supply voltage fluctuations when the relay trip contact is open, and
  ii) a current sensing device for producing an output signal indicative of the current drawn by the supervision circuit.

11. The trip circuit according to claim 10, wherein the supervision circuit comprises a constant current source.

* * * * *